Aug. 15, 1961 J. L. HENSLEY 2,996,088
MOTOR-COUNTERBLANCED CUTTING MACHINE
Filed July 28, 1959 4 Sheets-Sheet 2

INVENTOR
JAMES L. HENSLEY,

BY Sweeker & Mathis
ATTORNEYS

Aug. 15, 1961
J. L. HENSLEY
2,996,088
MOTOR-COUNTERBLANCED CUTTING MACHINE
Filed July 28, 1959
4 Sheets-Sheet 3
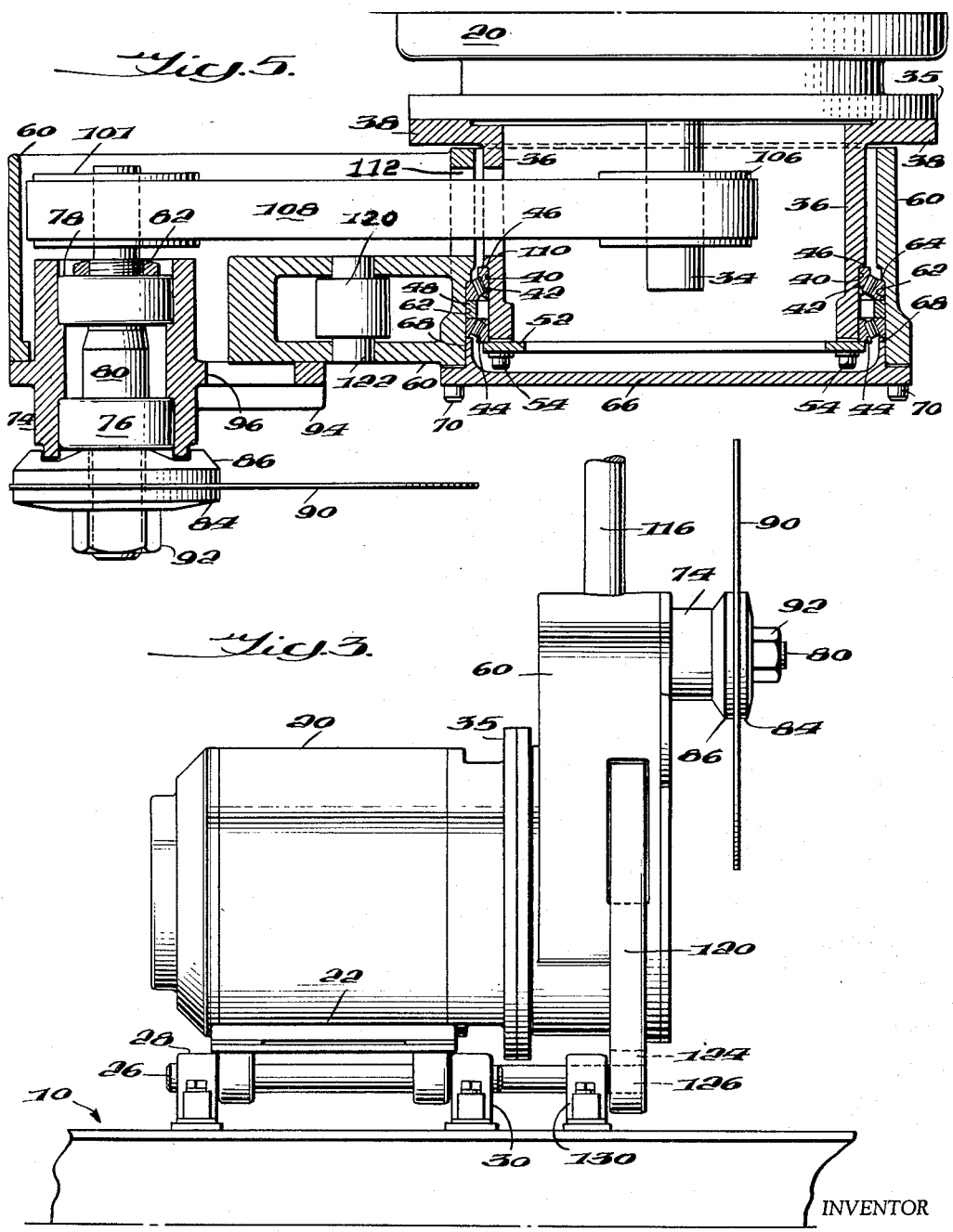
INVENTOR
JAMES L. HENSLEY,
BY Sweeker & Mathis
ATTORNEYS

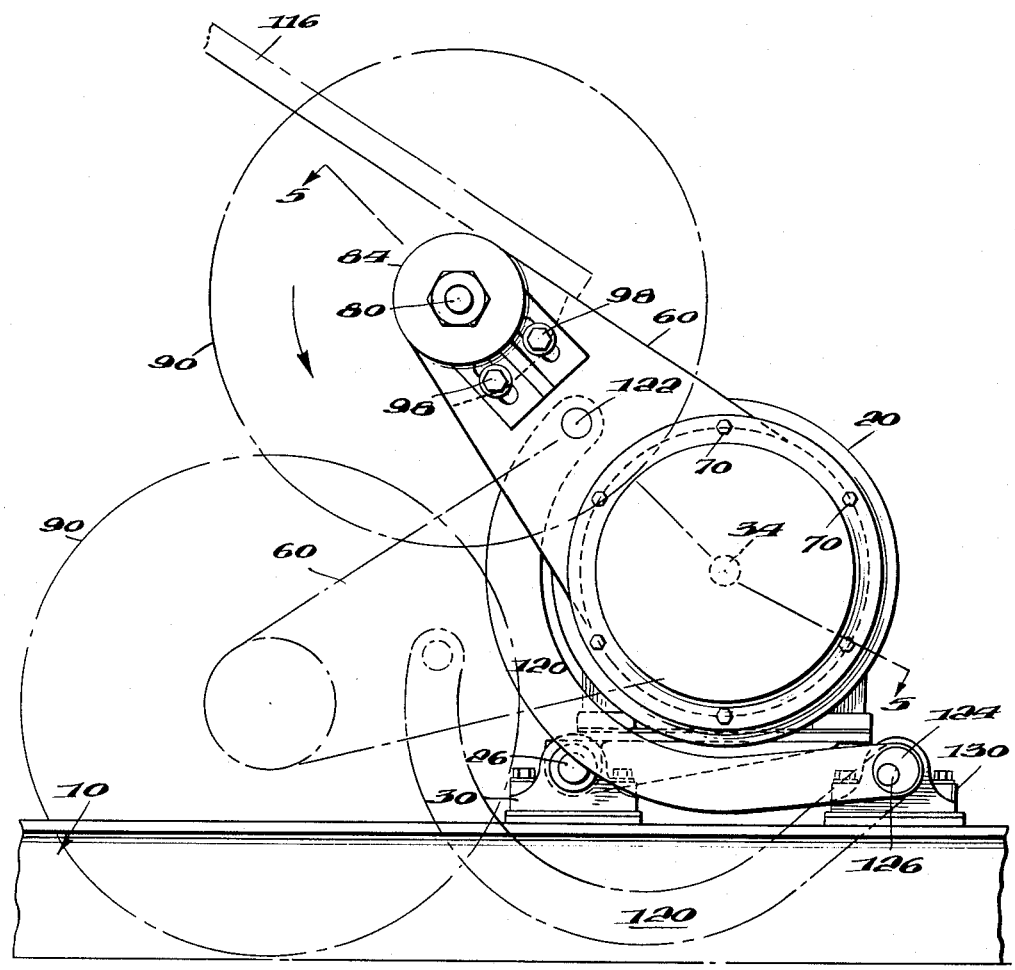

United States Patent Office 2,996,088
Patented Aug. 15, 1961

2,996,088
MOTOR-COUNTERBALANCED CUTTING MACHINE
James L. Hensley, Clinton, Tenn., assignor to Ty-Sa-Man Machine Company, Knoxville, Tenn., a corporation of Tennessee
Filed July 28, 1959, Ser. No. 830,041
10 Claims. (Cl. 143—46)

This invention relates to cutting machines, and more particularly, to cut-off saws of a type sometimes referred to as "chop-stroke" saws.

Such saws are used to cut long members, such as bars, rods, boards, etc., into pieces of smaller length. The pieces may be of steel, wood, plastic, or almost any kind of material. Normally, however, it is desirable that the saw be specially adapted to the cutting of metal objects, such as structural steel shapes.

The member to be cut usually is held on a table or bench, and the sawing or cutting blade is moved so as to sever the work. The blade is mounted on a supporting structure so that it will always move in a fixed path, usually an arc. Sometimes, linear rather than arcuate movement of the blade is provided, but always the blade will move in a plane which has been determined before hand. Arcuate movement of the blade is achieved by mounting the blade on one end of a pivoted arm. Operation of the cut-off saw is carried out by moving the work along a path which is substantially normal to the plane of the arc through which the blade moves, stopping the work so that the point where the cut is to be in the work will be in the path of the blade, and then moving the blade through an arc so as to cut through the work.

The cutting machine of this invention is concerned with this general type of operation, but more particularly it is concerned with cut-off saws for severing steel members such as angles, channels, rods, bars and the like. A saw of this character must employ a powerful electric motor for rotating the blade, if it is to cut efficiently, and such motors are large and heavy. For example, a fifty horsepower motor may weigh over one thousand pounds.

The use of a heavy electric motor in a cut-off saw introduces many problems, the most serious of which concern the accuracy of the cut through the work, the movement of the blade into the cutting position, and the wearing of the various parts. These problems have been of considerable importance in previous types of cut-off saws, and have served to limit the size of the electric motors used in cut-off saws of the chop-stroke type.

One previous type of cut-off saw employs an arm pivoted at its mid-portion to a stationary table structure, with a blade rotatably fixed to it at one end and an electric motor counterbalancing the weight of the blade at the other end. The arm and pivot in effect form a simple lever device. The motor is placed a suitable distance from the pivot so that the weight of the motor overbalances the weight of the blade end of the arm and raises the blade above the table. By means of a handle, the blade end of the arm can be pivoted downwardly to engage the work by overcoming the weight of the motor.

The arrangement is not satisfactory when it becomes desirable to use a large, and consequently a heavy, electric motor. In the first place, the heavier the motor, the closer it must be placed to the pivot. In using an extremely heavy motor, a point is reached where the motor must be placed almost over the pivot. When the blade end of the arm is swung downwardly, the motor will pivot upwardly a slight distance, pass over the pivot, and then exert a downward force on the blade end of the arm, so that the counterbalancing effect of the motor is lost. Springs cannot be used satisfactorily to overcome this defect chiefly because it is difficult, if possible at all, to obtain a constant counterbalancing effect.

In addition to the counterbalancing problem arising from the use of a heavy motor in this previous type of cut-off saw, there are the problems of keeping the parts, particularly the blade, directly aligned at all times so as to always obtain an accurate cut through the work, and of preventing excessive wear of the moving parts, particularly at the pivot.

These problems have led to the development of other types of cut-off saws which use elaborate superstructures for carrying large motors above the work tables. Often complicated linkage arrangements are necessary to carry out the sawing operation. Other disadvantages arise in that the machines are more expensive to construct and maintain, are usually more complex in operation, and take up considerable space.

Another problem which comes from the use of a large electric motor, regardless of the particular supporting and operating structure used, concerns the undesirable movement or shifting of the work caused by the blade as it enters the work. A rotating blade creates forces which shift the work due to the resistance of the material as it is engaged by the blade. Work holders overcome this problem by providing gripping forces on the work which counteract the forces of the blade and hold the work in place, but work holders in no way lessen the forces in the blade. When electric motors of high horsepower are used, the difficulty of holding the work against movement, and consequently of providing suitable work holders, is increased.

Also, in this respect, there is a tendency for the blade to move out of its path because of the resistance of the material to the blade. Any movement of the blade transverse to the predetermined plane of its arc will, of course, lessen the accuracy of the cut and, in addition, can cause damage to the saw.

One object of this invention is to provide a cut-off saw which is capable of being provided with a large and powerful motor, thereby making the saw suitable for cutting large steel members of the like.

Another object is to provide a cut-off saw which can produce an accurate cut through the work, which allows for easy operation of the blade, and in which the parts are not readily worn.

Another object is to provide, in a cut-off saw, means for reducing undesirable forces which tends to shift the work when it is engaged by the blade and which tend to move the blade from its predetermined path.

Another object is to provide a cut-off type sawing machine employing a high horsepower motor, which sawing machine is adapted to be used on a simple table structure so that the machine occupies relatively little space and is easily transported.

A further object is to provide a cut-off type sawing machine for cutting large steel members or the like, which saw is of relatively simple construction and operation, and which is comparatively inexpensive to manufacture and to maintain in satisfactory running condition.

These objects may be accomplished, according to one embodiment of the invention, by providing a rotatable saw blade carried by an arm mounted upon an end of an electric motor through a large diameter bearing coaxial with the output shaft of the motor. The motor preferably is large and powerful, and it serves to rotate the saw blade.

The motor-and-arm assembly is mounted on a table or supporting frame in such a way that the weight of the motor serves effectively to bias the saw blade upwardly with a moderate force which does not vary a great deal over the entire working stroke of the saw. This result is achieved by pivoting the motor on the frame for movement about an axis in front of the center of gravity of the motor, and by providing a lever pivoted to the saw arm in front of the motor and pivoted to the frame behind the motor. All of the pivot axes are parallel to the axis of the output shaft of the motor.

Additionally, the saw blade may oscillate back and forth as it moves downwardly through its cutting stroke. This permits the work-engaging surface of the blade to withdraw periodically and then feed into the work again under full pressure, so as to minimize the twisting strains on the blade. Such oscillations may be brought about by pivoting the lever of the saw mount on a power driven eccentric. When the eccentric rotates, the lever shifts back and forth to move the saw arm and the blade in the required pattern.

This embodiment of the invention is illustrated in the accompanying drawings in which:

FIG. 3 is a front elevation view of a portion of the machine;

FIG. 4 is a side elevation view corresponding to FIG. 3; and

FIG. 5 (Sheet 3) is a sectional view taken along line 5—5 of FIG. 4.

Figure 1:
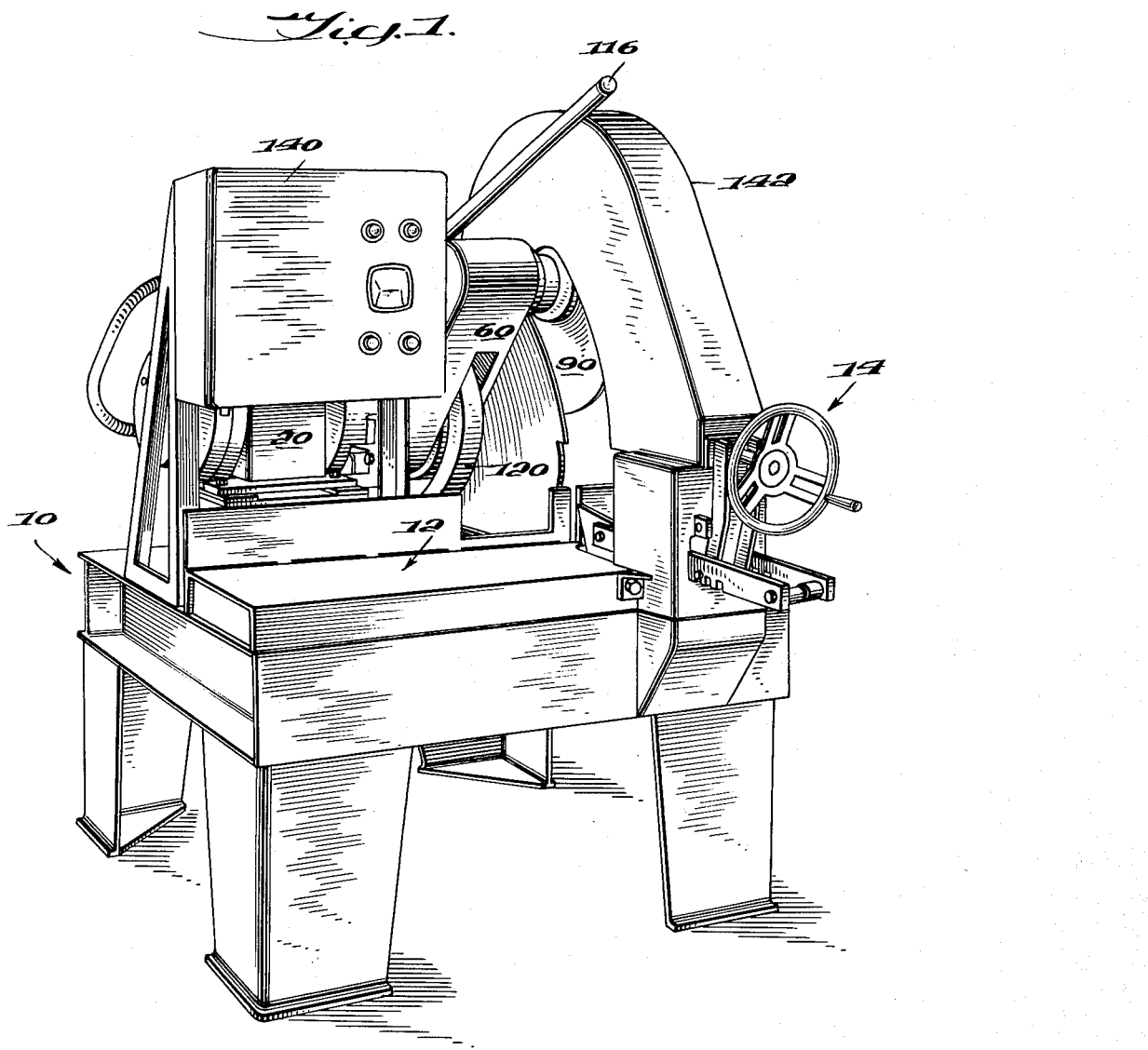
FIG. 1 is a perspective view of the front of a cut-off type sawing machine embodying this invention.
Figure 2:
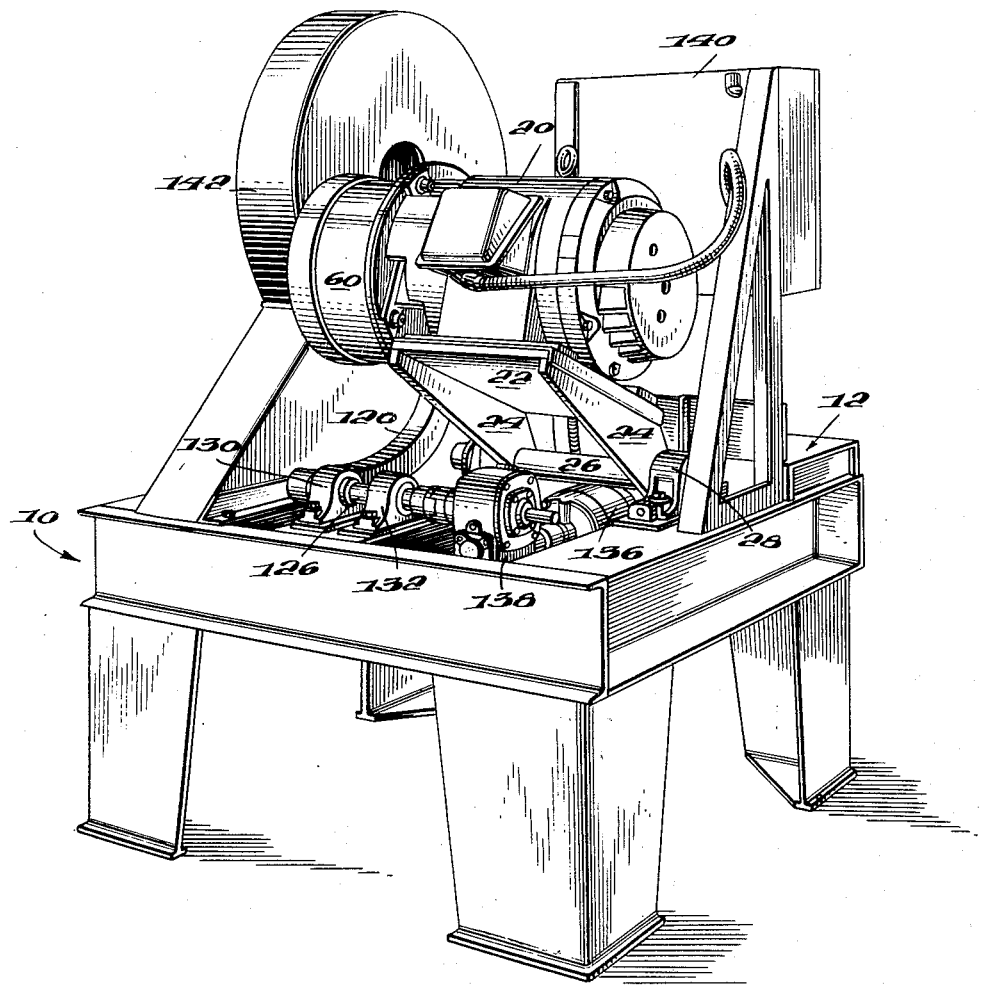
FIG. 2 is a perspective view of the rear of the machine.

The configuration of a cut-off sawing machine constructed according to this invention is illustrated in FIGS. 1 and 2. All of the mechanism is mounted in a compact manner on a table 10. This allows the machine to be placed conveniently wherever desired, as in a machine shop, and also allows the machine to be moved as a single unit. If desired, instead of mounting the mechanism on a table as illustrated, the mechanism may be mounted on any suitable supporting structure.

The table 10, illustrated in FIG. 1, is provided with a bed or work support portion 12 for receiving the work (not illustrated). Also, the table 10 is provided with a work holder designated generally by reference numeral 14. The work holder 14 may be of any conventional construction. Work holders, such as the work holder 14 illustrated in FIG. 1, usually employ clamping elements which can be adjusted by a wheel or crank member to hold the work in a desired position. The cut-off saw of this invention is particularly suitable for cutting relatively large members of hard material such as steel, or the like, and accordingly, this should be taken into consideration when selecting the table 10, the bed portion 12, and the work holder 14 to be used with the mechanism.

Continuing now with a description of the various parts which form the sawing mechanism, power is supplied for the sawing operation by an electric motor 20. As previously pointed out, the sawing machine is particularly suitable for cutting large steel members. Therefore, the motor 20 will be of high horsepower, and will be relatively heavy.

As illustrated in FIG. 2, the motor 20 is fixed as by bolts or other means to a plate 22. Rigidly fixed to and depending from the plate 22 are parallel flanges 24, which carry at their lower portions a pin or shaft 26. Fixed to the table, as by bolts, there are bearings 28 and 30 for receiving the pin 26 and supporting it in a horizontal position. The pin 26 affords a horizontal axis about which the flanges 24, the plate 22, and the motor 20 can rotate.

In FIG. 5 there is illustrated a portion of the motor 20 whose shaft is indicated by reference numeral 34. The motor 20 is of the type which has a large flange 35 on one end thereof. It should be noted that the motor 20 is mounted on the plate 22 so that the motor shaft 34 is parallel to the pin 26, and so that the face of the flange 35 is in a plane perpendicular to the shaft 34 and the pin 26. A cylindrical-shaped bearing bracket 36 surrounds the shaft 34 and is coaxial therewith. The bearing bracket 36, at its inside end adjacent the motor 20, is provided with a flange 38 which is substantially coextensive with the flange 35 and the flanges 35 and 38 are fastened together, as by bolts or other suitable means.

A portion of the outside surface of the bearing bracket 36 is, as indicated, cut away at 40, in order to receive two large diameter bearing assemblies 42 and 44. The bearing assembly 42 rests against a shoulder portion 46 on the bearing bracket and is separated from the bearing assembly 44 by a spacer ring 48. The bearing assemblies 42 and 44 are held in place on the bearing bracket 36 by an annular bearing-adjustment plate 52 which is secured to the outside portion of the bearing bracket 36 by means of a suitable number of bolts 54.

The machine has a saw arm 60, the general shape of which is illustrated in FIG. 4. The arm 60 is somewhat triangular or tapered, with a rounded, large rear portion and a rounded, smaller front portion. As shown in FIG. 5, the rear portion of the arm 60 has a cylindrical-shaped portion larger in diameter than the bearing bracket 36. This cylindrical portion fits over and is coaxial with the bearing bracket 36. A part of the inside surface of the cylindrical portion of the arm 60 is cut away, as indicated at 62, in order to receive the bearing assemblies 42 and 44. The bearing assembly 42 fits up against a shoulder portion 64 on the inside of the cylindrical portion of the arm.

A circular-shaped cover plate 66 fits over the rear end of the arm 60 and has an inwardly extending flange 68, the innermost end of which abuts the bearing assembly 44. A plurality of bolts 70 serve to secure the cover plate 66 to the arm 60 and allow the cover plate to be removed for access to the inside of the cylindrical portion of the arm 60, when desired.

It should now be evident that the arm 60 may pivot about the bearings 42 and 44 with the actual center of rotation being the axis of the motor shaft 34. Particular attention should be given to the manner in which the bearing assemblies 42 and 44 are retained in position. The bearing assemblies are of the thrust type, accommodating thrusts parallel to the shaft 34 in opposite directions. The inner races of the bearing assemblies 42 and 44 are held against movement by the shoulder 46 and the plate 52, respectively. Manipulation of the bolts 54 will adjust the position of the inner race of the outside bearing assembly 44. The outer races of the bearing assemblies are held in position by the shoulder 64 and the flange 68, and the spacer ring 48 spaces the bearing assemblies apart for stability. Manipulation of the bolts 70 will adjust the position of the outer races.

This arrangement affords a sturdy pivot for the arm 60 and eliminates any wobbling or sidewise movement of the arm. In this same respect, the provision of the large diameter bearing assemblies materially reduces any wearing of the parts, which eventually would allow the arm 60 to wobble. Accordingly, it should be readily apparent that in this manner provision has been made for ensuring that the arm 60 will always move in a predetermined fixed path.

At the front end of the arm 60 there is a cylindrical-shaped bearing housing 74. Inside the housing 74 there are bearings 76 and 78, preferably in the form of sealed ball bearing units, which receive a rotatable spindle 80. A lock nut 82 is threaded on the spindle and bears against the inner bearing 78. At the outer end of the spindle 80, there are flanges 84 and 86 cooperating to hold a toothed blade or abrasive cutting blade 90 on the spindle. The inner saw flange 86 is threaded on the spindle 80 and bears against the outer bearing 76. A nut 92 threaded on the spindle serves to force the outer saw flange 84 toward the inner saw flange 86 to hold securely the blade 90.

The spindle housing 74 is provided with a transverse extension 94 which has slots 96. By means of bolts 98 which extend through the slots 96 and through suitable holes provided in the arm 60, the spindle housing 74 can be adjusted along the length of the arm 60 as shown in FIG. 4.

The inner end of the spindle 80 is provided with a pulley 104, and similarly the motor shaft 34 is provided with a pulley 106. An endless belt 108 which surrounds the pulleys 104 and 106, provides a driving connection between the motor 20 and the saw blade 90. The belt 108 passes through slots or openings in the bearing bracket 36 and the arm 60, as indicated by reference numerals 110 and 112, respectively.

The arm 60 is equipped with a handle 116 (FIGS. 1 and 4) which projects to the front of the machine where it may be grasped and moved by an operator.

When electric current is supplied to the motor 20, the shaft 34 will rotate the pulley 106, the belt 108, the pulley 104, the spindle 80, and the blade 90. At the same time, the operator may pull on the handle 116 to rotate the arm 60 on the bearing assemblies 42 and 44 about the axis of the motor shaft 34.

Located beneath the arm 60 there is a C-shaped or curved lever 120 pivotally connected to an intermediate portion of the arm 60 by means of a pin or bolt 122. The opposite end of the lever 120 is connected by means of an eccentric or cam 124 (FIG. 4) to a shaft 126. The cam 124 is fixed to the shaft 126 and rotates in the end of lever 120. The shaft 126 turns in bearings 130 and 132 which are attached to the table 10 as by bolts.

As shown in FIG. 2, the shaft 126 is driven by a small electric motor 136 through a gear box 138 both of which are suitably mounted on the table 10 beneath the plate 22. When the shaft 126 is rotated by the motor 136, it will rotate the cam 124 which in turn will impart an oscillating motion to the arm 120.

The movement of the various parts can be visualized best perhaps from FIG. 4. As pointed out previously, the motor 20 can pivot about the pin 26, and the arm 60 can pivot on the bearing assemblies 42 and 44 about the axis of the motor shaft 34. The bolt 122 provides a pivotal connection between the lever 120 and the midsection of the arm 60, and the cam 124 provides a pivot for the lever 120. All of the axes of rotation provided by these four pivots are parallel. It should be noted also that the rotary axis of the spindle 80, and consequently, the blade 90, is parallel to axes of the above described four pivots.

As illustrated in FIG. 4 the major portion of the motor 20 is to the right of the pivot 26, and accordingly, the center of gravity of the motor 20 is to the right of the pivot 26. The same is true with respect to the center of gravity of the motor 20 and the pivot 122. When the operator is not pulling downwardly on the handle 116, the weight of the motor 20 will cause the rear, or right hand end of the arm 60 to move downwardly and the left hand or blade end of the arm 60 to move upwardly. This position is shown in solid lines in FIG. 4 and is the upper or non-cutting position of the blade 90.

When the operator pulls downwardly on the handle 116, the right hand end of the arm 60 moves upwardly, and in so doing, it will turn about the bearing assemblies 42 and 44, while the motor 20 pivots upwardly about the pivot 26. At the same time, the lever 120 and the pivot 122, will pivot downwardly about the pivot 124. This will cause the saw blade 90 to move from the upper position to a cutting position. The cutting position of the blade 90, the arm 60, and the lever 120 are shown by broken lines in FIG. 4. The cutting position of the motor 20 is shown in FIG. 2. The movement of the arm 60 from the upper position to the cutting position can be said to be a gliding movement, and similarly, the movement of the blade 90 will be a gliding movement.

When current is supplied to the motor 136 to rotate the shaft 126 and the cam 124, the cam 124 will provide a continuous oscillating motion to the lever 120, which in turn will provide an oscillating motion to the blade 90 through the pin 122 and the arm 60, and accordingly, when the blade 90 enters the work it will do so with an oscillating motion. The blade 90 will pass through the work, against the resistance of the material, by exerting alternately greater and lesser cutting forces against the material due to the oscillating effect. This is distinguished from the usual cutting movement of a rotating blade wherein the blade applies a continuous cutting force to the work.

When a rotating blade enters a workpiece there is eventually developed a tendency for the blade to shift sideways because of the continuous resistance of the work to the blade. This tendency for a rotating blade to move out of its path is reduced when an oscillating motion is imparted to the blade due to the fact that the forces which would cause the blade to move sideways are relieved periodically.

Similarly, when a blade rotating at a high rate of speed enters a workpiece, there is a tendency for the workpiece to move. In effect, the forces which tend to move the workpiece are the reacting forces which cause the blade to move out of its path. Consequently, by imparting an oscillating motion to the saw blade, not only are the forces which tend to move the blade from its path reduced, but also the forces which tend to shift the workpiece are reduced. Obviously, a more accurate cut through the workpiece can be obtained by reducing the tendency for the blade to move out of its path and the tendency for the workpiece to shift.

The arrangement of the various pivots 26, 34, 122 and 124 furnish a mechanical advantage so that the operator must apply only a moderate amount of downward pressure on the handle 116 in order to move the blade 90 toward the work. The arcuate movement of the motor will have an upward vertical component which will be greater than its horizontal component. The degree of mechanical advantage is directly related to the ratio of the moment arm of the center of gravity of the motor 20 and the moment arm of the downward pressure applied by the operator. The moment arm of the center of gravity of the motor is the horizontal distance between the pivot 26 and the motor shaft 34. This distance is relatively short compared with the effective moment arm of the downward force applied by the operator which is the distance from the part of the handle 116 which is grasped by the operator to a point near the pivot 124. The relatively great distance of the latter moment arm is achieved because of the manner in which the arm 60 and the handle 116 glide about the movable pivot 122 and the fixed pivot 124.

The mechanical advantage can be visualized by comparing the arc through which the motor 20 moves and the arc through which the handle 116 moves. The motor 20 travels a relatively short distance in an arc having a short radius while the outside end of the handle 116 travels a relatively great distance in an arc having a large radius.

The counterbalancing effect of the motor 20 is deemed to be apparent. The weight of the motor will always act to urge the blade end of the arm 60 toward its upper position. Yet, as just explained, only a relatively moderate amount of downward pressure on the handle 116 is necessary to overcome the weight of the motor 20 to move the blade 90 downwardly to the cutting position. The counterbalancing effect of the motor 20 is achieved because the center of gravity of the motor always remains slightly to the right of the pivots 26 and 122, as viewed in FIG. 4.

The effectiveness of the mounting structure in converting the extremely heavy weight of the motor 20 into a moderate counterbalancing force is only one of its advantages. Referring again to FIG. 4, it will be observed that the blade 90 rotates in such a direction that it would tend to "walk" to the left in FIG. 4 when in contact with the work. Note also that the mounting arrangement is such that movement of the blade 90 to the left would have to be accompanied by some downward movement of the blade 90. This means that the reaction forces developed as the blade 90 contacts the work actually tend to feed the blade 90 more firmly into the cut being made.

One of the most important advantages of this machine is its ability to accommodate high horsepower electric motors, which may weigh as much as one thousand pounds. Previous types of chop-stroke saws have not been able to successfully employ such heavy motors. Furthermore, a heavy motor may be accommodated without the need of special, cumbersome, mounting structures, such as overhead rails and brackets, etc. This allows the mechanism to be compact and easily transportable. It may be mounted on a simple table structure 10 on which may be placed a control panel 140 (FIGS. 1 and 2) for containing the necessary electrical equipment. Also, it is a relatively simple matter to provide the machine with suitable guard means 142.

Even though the motor 20 may be very heavy, a small amount of force on the handle 116 will operate the saw blade 90. This is accomplished by the special arrangement of pivots. Additionally, the weight of the motor is used to counterbalance the saw arm 60, thereby urging the saw blade 90 with a constant force to the upper position. This also is accomplished by the special arrangement of pivots without the use of any type of counterbalancing spring arrangement. The constant counterbalancing effect allows the operator to pull downwardly on the handle 116 with a constant force thereby giving him good control over the sawing operation.

An accurate cut through the work is ensured because the saw blade will move in a predetermined path. The path of the saw blade is fixed by the sturdy bearing assembly arrangement and by lessening the forces which would tend to move the blade 90 out of its path and which would tend to move the workpiece. This is accomplished by imparting an oscillating movement to the saw blade 90 without complicating the sawing operation.

It is recognized that, while the invention has been illustrated and described in a certain preferred embodiment, variations and changes may be made therein without departing from the invention as set forth in the claims.

I claim:

1. In a cutting machine, the combination of a motor rotatable about a fixed horizontal axis, a bracket secured to said motor, bearing means on said bracket, an arm pivotable on said bearing means about an axis parallel to said fixed axis and movable with said motor, a link rotatable about an axis parallel to said fixed axis and pivotally connected with said arm, a rotary blade mounted to one end of said arm, drive means connecting said motor and said blade, and means associated with said link for imparting oscillating motion to said blade, whereby a force applied to the blade end of the arm will simultaneously turn the arm about the pivotal connection with the link, pivot the arm about the bearing means, rotate the motor and the link about their respective pivots, and the blade will move from a non-cutting to a cutting position with a sliding and oscillating motion.

2. In a cutting machine, the combination of power means having a horizontal output shaft, said power means adapted to be mounted on a supporting structure for rotation about a fixed axis which is parallel to the axis of the shaft, arm means connected to said power means so as to be rotatable about the axis of the shaft, cutting means on said arm means and spaced from said rotatable connection, means for providing a driving connection between the shaft and said cutting means, and a link pivotally connected to said arm means between said cutting means and said rotatable connection, the axis of said pivotal connection being parallel to the axis of the shaft, said link adapted to be mounted on a supporting structure for rotation about a fixed axis which is parallel to the axis of the shaft whereby the arm will move downwardly in a gliding motion.

3. In a cutting machine, the combination of power means having a horizontal output shaft, said power means adapted to be mounted on a table structure for rotation about a first fixed axis which is parallel to the axis of the shaft, link means adapted to be mounted on a table structure for rotation about a second fixed axis which is parallel to said first fixed axis, arm means having a first pivotal connection with said power means and a second pivotal connection with said link means, the axes of said pivotal connections being parallel to but movable with respect to said fixed axes, said arm being movable so that said first pivotal connection will rotate about said first fixed axis and said second pivotal connection will rotate about said second fixed axis, cutting means mounted on said arm and spaced from said second pivotal connection away from said first pivotal connection so that the weight of said power means overbalances said cutting means to raise said cutting means to a non-cutting position above the table structure, and means by which said arm can be moved so as to overcome the overbalancing effect of said power means and carry said cutting means to a cutting position near the table structure.

4. In a cutting machine, the combination of power means adapted to be mounted on a table structure for rotation about a horizontal fixed axis, link means, cam means adapted to be mounted on a table structure for providing a second axis which is parallel to said fixed axis, said link being in contact with said cam means and rotatable about said second axis, arm means having a first pivotal connection with said power means and a second pivotal connection with said link means, the axes of said pivotal connections being parallel to but movable with respect to said fixed axis, cutting means mounted on said arm means and driven by said power means, and means for revolving said cam means so as to impart an oscillating motion to said link means, to said arm means and to said cutting means, said arm being movable from a non-cutting position wherein said cutting means is away from the table structure to a cutting position wherein said cutting means is near the table structure during which movement said first pivotal connection rotates about said fixed axis and said second pivotal connection rotates about said second axis.

5. In a cutting machine, the combination of power means, said power means adapted to be mounted for rotation about a first horizontal axis, link means adapted to be mounted for rotation about a second horizontal axis which is parallel to said first axis, arm means having a first pivotal connection with said power means and a second pivotal connection with said link means, the axes of said pivotal connections being parallel to but movable with respect to said first and second axes, said arm being movable so that the first pivotal connection will rotate about said first axis and said second pivotal connection will rotate about said second axis, cutting means mounted on said arm and spaced from said second pivotal connection away from said first pivotal connection so that the weight of said power means overbalances said cutting means to raise said cutting means to a non-cutting position, and said cutting means being movable downwardly to a cutting position.

6. In a cutting machine, the combination of power means having a shaft, said power means adapted to be mounted for rotation about a first horizontal axis, link means adapted to be mounted for rotation about a second horizontal axis which is parallel to said first axis, arm means having a first pivotal connection with said power means and a second pivotal connection with said link means, the axes of said pivotal connections being parallel to but movable with respect to said first and second axes, said arm being movable so that the first pivotal connection will rotate about said first axis and said second pivotal connection will rotate about said second axis, cutting means mounted on said arm and spaced from said second pivotal connection away from said first pivotal connection so that the weight of said power means overbalances said cutting means to raise said cutting means to a non-cutting position, said cutting means being movable downwardly to a cutting position, and means associated with said second axis to oscillate said link means during its pivotal movement.

7. In a cutting machine, the combination of power means, said power means adapted to be mounted for rotation about a first horizontal axis, link means adapted to be mounted for rotation about a second horizontal axis which is parallel to said first axis, arm means having a first pivotal connection with said power means and a second pivotal connection with said link means, the axes of said pivotal connections being parallel to but movable with respect to said first and second axes, said arm being movable so that the first pivotal connection will rotate about said first axis and said second pivotal connection will rotate about said second axis, cutting means mounted on said arm and spaced from said second pivotal connection away from said first pivotal connection so that the weight of said power means overbalances said cutting means to raise said cutting means to a non-cutting position, said cutting means being movable downwardly to a cutting position, cam means in the connection of said link means to said second axis, and power means to rotate said cam means to oscillate said link means.

8. In a cutting machine, the combination of an electric motor having a horizontal output shaft and a flange end, said electric motor adapted to be mounted for rotation about a first axis which is parallel to the axis of the shaft, link means adapted to be mounted for rotation about a second axis which is parallel to said first axis, bracket means fixedly attached to said flange end of said motor and surrounding said shaft, a bearing supported on said bracket means, arm means having a portion surrounding said bracket means and said bearing means for rotation about said bearing means, said link means having a pivotal connection with said arm means, the axis of said pivotal connection and the rotational axis of the arm means being parallel to but movable with respect to said first and second axes, said arm means being movable so that the rotational axis will rotate about the first axis and said pivotal connection will rotate about said second axis, cutting means mounted on said arm means and spaced from said pivotal connection away from the rotational connection so that the weight of said electric motor overbalances said cutting means to raise said cutting means to a non-cutting position, and said cutting means being movable downwardly to a cutting position.

9. A cutting machine comprising an electric motor having a flange end, bracket means fixedly attached to said flange end and surrounding the shaft of the motor means, bearing means on said bracket means, and a saw arm having a portion surrounding said bracket means and said bearing means and rotatable on said bearing means.

10. A cutting machine comprising motor means, a large cylindrical bracket adapted to be fixedly attached to one end of the motor having an axis coincident with the axis of the motor shaft, a bearing mounted on the outer portion of the bracket, an elongated slot in the wall of the inner portion of the bracket, an arm having a cutting element at one end, a cylindrical portion at the other end of said arm secured to said bracket and supported on said bearing for rotation relative thereto, an elongated slot in the cylindrical portion of said arm and overlying said first mentioned slot, drive means extending through said slots and connected to said cutting element for driving said cutting element.

References Cited in the file of this patent

UNITED STATES PATENTS

| | | |
|---|---|---|
| 932,324 | Reno | Aug. 24, 1909 |
| 1,301,251 | Graves | Apr. 22, 1919 |
| 1,690,111 | Heston et al. | Nov. 6, 1928 |
| 1,745,699 | Kleeb et al. | Feb. 4, 1930 |
| 1,746,594 | Jacobson | Feb. 11, 1930 |
| 1,942,834 | Railley | Jan. 9, 1934 |
| 2,089,074 | Sharp | Aug. 3, 1937 |
| 2,372,699 | Wiken et al. | Apr. 3, 1945 |

FOREIGN PATENTS

| | | |
|---|---|---|
| 32,428 | Sweden | Mar. 6, 1912 |
| 544,470 | France | June 22, 1922 |